United States Patent
Alton et al.

[15] 3,648,183
[45] Mar. 7, 1972

[54] SIGNAL LEVEL RESPONSIVE CIRCUIT

[72] Inventors: Ahdor H. Alton, Lake Zurich; Mitchell I. Kohn, Skokie, both of Ill.

[73] Assignee: Gulton Industries, Inc., Metuchen, N.J.

[22] Filed: Aug. 20, 1970

[21] Appl. No.: 65,575

Related U.S. Application Data

[62] Division of Ser. No. 827,714, May 26, 1969, Pat. No. 3,591,077.

[52] U.S. Cl.............................328/196, 307/235, 307/240, 307/290, 328/150, 328/203, 328/209
[51] Int. Cl..................H03k 3/15, H03k 3/295, H03k 17/30
[58] Field of Search..................307/232, 235, 240, 265, 268, 307/290; 328/109, 196, 206, 209, 203, 150

[56] References Cited

UNITED STATES PATENTS 3,474,264 10/1969 Hughes...................................307/290
3,324,309 6/1967 Zeller, Jr. ..............................307/290

Primary Examiner—Donald D. Forrer
Assistant Examiner—L. N. Anagnos
Attorney—Wallenstein, Spangenberg, Hattis & Strampel

[57] ABSTRACT

A signal level responsive circuit including a Schmitt trigger-type circuit is provided which acts both as a signal level responsive circuit and a phase detector by energizing at least one of the current control devices of the circuit with a pulsed waveform voltage resembling a half-wave rectified AC voltage. The signal fed to the control input terminal of the Schmitt trigger circuit comprises a chopped waveform of the varying amplitude control signal involved, the chopped waveform also resembling a half-wave rectified AC waveform whose pulses vary in amplitude with the control signal and synchronized with the pulsed energizing voltage waveform. The Schmitt trigger circuit per se most advantageously has a very small hysteresis, but the signal level responsive circuit has a much greater overall hysteresis provided by a feedback circuit which increases the effective amplitude variation of the control signal after the Schmitt trigger circuit is triggered into its unstable condition.

6 Claims, 1 Drawing Figure

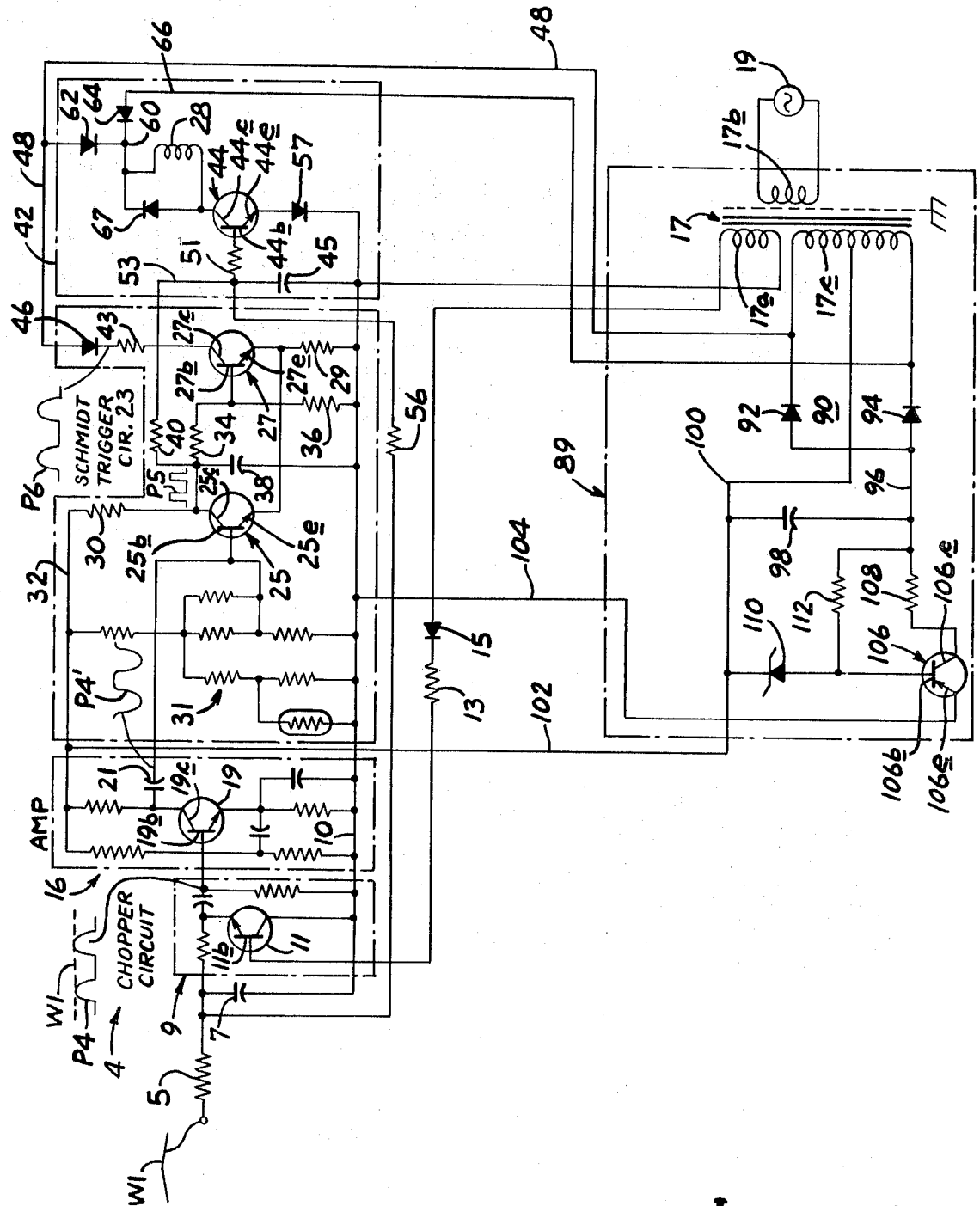

SIGNAL LEVEL RESPONSIVE CIRCUIT

This application is a division of application Ser. No. 827,714, filed May 26, 1969, now U.S. Pat. No. 3,591,077, granted July 6, 1971.

This invention relates to signal level responsive circuits which, when a signal reaches or rises above a given upper trip limit, will effect a given control function, such as the energization of the heating or cooling coil in the proportioning temperature control system of the aforesaid application Ser. No. 827,714 and, when the signal reverses direction and reaches or drops below a lower trip level, terminates the control function. (The difference between the upper and lower trip levels is often referred to as the hysteresis of the circuit.) The specific aspects of the invention deal with an improved Schmitt trigger circuit which serves preferably both as a small hysteresis signal level responsive circuit and a phase detector.

The Schmitt trigger circuit makes an especially reliable transistorized signal level responsive circuit of the type described for a number of reasons including the ease with which a transistorized trigger circuit can be temperature compensated. For maximum sensitivity, a Schmitt trigger circuit should have a very small hysteresis. However, a small hysteresis trigger circuit is disadvantageous in that noise components or small undesired variations in the control signal can inadvertently drop the signal below the lower trip level and thereby cause an undesired resetting of the circuit.

One of the aspects of the present invention is to provide a signal level responsive circuit (most advantageously including a Schmitt trigger circuit) which has the sensitivity of a signal level responsive circuit with a relatively small hysteresis and the reliability of one having a relatively large hysteresis. Thus, in accordance with the invention, a Schmitt trigger circuit or the like is designed to have a very small hysteresis. When the control signal level reaches the upper trip limit of the Schmitt trigger circuit, a control signal modifying signal is fed back to the input of the signal level responsive circuit effectively to increase the apparent input signal so that the actual control signal must drop a greater amount than that required by the actual lower trip limit of the Schmitt trigger circuit.

To improve the reliability of the signal level responsive circuit, the control signal for the Schmitt trigger circuit, which is generally a continuous DC voltage, is a chopped signal resembling a half-wave rectified AC waveform, the amplitude of the pulses of the chopped waveform varying with the amplitude of the main DC control signal. The Schmitt trigger circuit, which generally comprises a pair of current control devices, one of which is initially in a nonconductive state and the other of which is initially in a conductive state, is modified by energizing at least one of the current control devices by a voltage which also resembles a half-wave rectified AC waveform which is in phase with the chopped control signal waveform. In this manner, the Schmitt trigger circuit acts both as a signal level responsive circuit and a phase detector since out of phase signals will not affect the circuit. Also, it has been discovered that the provision of such a pulsed energizing voltage waveform effectively reduces the hysteresis of the Schmitt trigger circuit in a very simple and reliable manner.

The above and other features and advantages of the invention will become apparent upon making reference to the specification to follow, the claims and the drawing which shows a preferred signal level responsive circuit incorporating the features of the present invention.

The input to the on-off signal level responsive circuit of the invention identified by reference number 4 is shown as a varying DC waveform W1 coupled by a resistor 5 to one of the terminals of a capacitor 7 whose opposite terminal is connected to a grounded line 10. The time constant of the charge circuit of the capacitor 7 is such that the capacitor 7 will have a voltage developed thereacross which follows the input signal waveform W1. The output of the capacitor 7 may be fed to a more or less conventional shunt-type chopper circuit generally indicated by reference numeral 9. The chopper circuit includes a transistor 11 which is alternately rendered conductive and nonconductive by the connection of its base electrode 11b through a resistor 13 and a rectifier 15 to the secondary winding 17a of a transformer 17 whose primary winding 17b is connected to a source 19 of 60 cycles per second AC voltage. Rectifier 15 couples half-wave rectified pulses from the transformer secondary winding 17a so the input to the chopper circuit 9 is effectively chopped at a 60 cycle per second rate where it can be readily amplified in a amplifier indicated by reference numeral 16. The output of the chopper circuit 9 therefore comprises a series of positive pulses P4 the amplitude of which corresponds with the increasing and decreasing portion of the input waveform W1.

The output of the chopper circuit 9 is fed to the base electrode 19b of a NPN-transistor 19. This transistor forms with the associated circuit elements a class A amplifier having negative going pulses P4' in the output thereof taken at the collector electrode 19c which is coupled through a capacitor 21 to the input to a Schmitt trigger circuit 23. This amplifier may, for example, have a gain of 10. The Schmitt trigger circuit is a unique Schmitt trigger circuit which, unlike conventional Schmitt trigger circuits, has at least one of the portions thereof energized from a pulsed voltage source of one polarity, preferably a half-wave rectified source of alternating current.

The Schmitt trigger circuit comprises a pair of NPN-transistors 25 and 27 having respective emitter electrodes 25e and 27e connected through a common feedback resistor 29 to the ground line 10. The collector electrode 25c of the transistor 25 is coupled through a resistor 30 to a positive bus 32 of a fixed DC voltage which also feeds a temperature compensated biasing network 31 for the transistor 25 which normally biases the transistor to a fully conductive state which may be referred to as the reset or normal state thereof. The base electrode 25b of transistor 25 is connected to the capacitor 21. The resultant flow of current through the common feedback resistor 29 will normally develop a sufficiently high positive voltage to keep the transistor 27 relatively nonconductive.

When the input voltage fed to the chopper circuit 9 reaches the circuit "turn on" level (for example, 110 millivolts), the resultant negative going portion of the chopped signal P4' developed at the output of the transistor 19 will drop the voltage at the base electrode 25b to a level which will drive the transistor 25 into a nonconductive state which, if the other transistor 27 is able to conduct, will form therewith a Schmitt trigger circuit wherein, through the feedback action of resistor 29 and a resistor 34 connected between the collector electrode 25c of transistor 25 and the base electrode 27b or transistor 27, reverses the conductive states of transistors 25 and 27 almost instantaneously so a sharp rise in voltage at the leading edge of a pulse P5 appears at the collector 65c of transistor 25. This pulse persists until the instantaneous value of the signal pulse P4' involved diminishes to a lower level than that which triggered the circuit, which may be referred to as the lower trip or reset level thereof.

The aforesaid resistor 34 forms with a resistor 36 coupled between the base electrode 27b of the transistor 27 and the ground line 10 to a voltage divider. A capacitor 38 is coupled between the collector electrode 25e of the transistor 25 and the ground line 10. The pulses P5 at the collector 25c of transistor 25 are coupled through a resistor 40 to the input of a relay control circuit 42 including a transistor 44 normally in a relatively nonconductive state. A filter capacitor 45 is coupled between the signal output side of resistor 34 and ground line 10. The voltage on this capacitor is a DC voltage equal to the average value of the pulses applied thereto. When this voltage is above a given threshold level, the transistor 44 becomes sufficiently conductive to energize a relay 28 connected in the load circuit of the transistor 44. The relay 28 is thus controlled by the output of the Schmitt trigger circuit and becomes energized after a number of pulses P5 appear on the collector electrode 25c. Consequently, where, as in the case of the circuit of patent application Ser. No. 827,714, now U.S. Pat. No.

3,591,077, the operation of relay 28 results in the decrease of the magnitude of the applied waveform W1 as well as the performing of a control function, such as the operation of a heating or cooling device. The negative going pulses P4' fed to the transistor 25 will continue to build up in amplitude after the first pulse P4' triggers the transistor 85 into its conductive state (which is the triggered or set state thereof) until relay 28 operates. Transistor 25 is repeatedly driven into conduction by each pulse P4' following the one which initially triggered the Schmitt trigger circuit 4 until the instantaneous amplitude of the input signal waveform W1 drops to a "turn off" level which may be 100 millivolts in the example being described. The peak values of the pulses P4' applied to the Schmitt trigger circuit operate the same in the same way that a steady varying DC waveform operates a conventional Schmitt trigger circuit because of the pulsing of the applied voltage energizing transistor 27 in a manner to be described.

As is well known, a Schmitt trigger circuit having a loop gain much greater than one has a substantial hysteresis characteristic so that a voltage level which triggers the same (referred to as an upper trip level) must reverse direction and reach a substantially different (referred to as a lower trip level) before the trigger circuit returns to the initial or reset state. It is frequently important that the hysteresis of a Schmitt trigger circuit be of an unusually small voltage (e.g., 50 millivolts in the exemplary system being described), and, to this end as well as for the purpose of forming a phase detector of the Schmitt trigger circuit, the transistor 27 which does not receive the control voltage is preferably energized by positive half-wave rectified 60 cycle per second voltage pulses P6 rather than a constant amplitude DC voltage as in the case of both transistors or the like of a conventional Schmitt trigger circuit. To this end, the collector electrode 27c of the transistor 27 is coupled through a resistor 43 and a rectifier 46 to a line 48 extending to one end of a center-tapped secondary winding 17c of the transformer 17. The phase of the positive half-wave rectified pulses P6 fed to the transistor 27 is the same as the half-wave rectified pulses P4 fed to the base of the chopper circuit transistor 71, so out of phase repetitive or cyclic interference pulses will not operate the Schmitt trigger circuit. After the initial triggering of the Schmitt trigger circuit and the operation of the relay 28 in the manner described above, as previously indicated, the amplitude of the negative going pulses fed by the capacitor 21 to the base electrode 25b of the transistor 25 will decrease in amplitude until the input voltage waveform W1 reaches the aforementioned "turn off" level (e.g., 100 millivolts) where the voltage resulting from pulses P4' and the biasing network 31 causes the transistor 25 to become continuously relatively highly conductive again. In effect, during the alternate half-cycles when transistor 27 is not receiving any energizing voltage, transistor 25 and the associated circuit elements act like an ordinary amplifier and, when transistor 27 receives the energizing pulses P6, the transistors 25 and 27 act as a Schmitt trigger circuit. The pulsing of transistor 27 results in a greatly reduced hysteresis for the trigger circuit and enables the circuit to act as a phase detector.

The base electrode 44b of the relay control transistor 44 is connected by a resistor 51 to a conductor 53 leading to the coupling resistor 40. A rectifier 57 is connected between the emitter electrode 44e of the transistor 44 and the ground line 10. The relay 28 is connected between the collector electrode 44c of the transistor 44 and a point 60 to which is coupled a full wave rectified AC voltage. Accordingly, a rectifier 62 is connected between the point 60 and conductor 48 extending to one end of the center-tapped secondary winding 17c. The point 60 is also coupled by a rectifier 64 to a conductor 66 extending to the other end of the secondary winding 17c. A reverse voltage preventing rectifier 67 to protect transistor 44 from high voltages induced in the relay 28 is connected in parallel with the relay.

As previously indicated, when the voltage input waveform W1 rises slightly above the "turn-on" level, the voltage on the capacitor 45 builds up to a value sufficiently high to raise the current flow in transistor 44 to a degree where the magnitude of the current flowing through the relay 28 will energize the same.

To provide a highly stabilized overall circuit hysteresis which will effect the resetting or turnoff of the circuit 4 at the "turn off" level (e.g., 100 millivolts) while using a small hysteresis Schmitt trigger circuit there is provided a positive feedback branch extending between the input point to the relay control amplifier circuit 42 at the ungrounded end of capacitor 45 and the input to the chopper circuit 9. The feedback branch includes a relatively large resistor 56 connected to the ungrounded plate of the capacitor 7 at the input of the chopper circuit 9. This feedback branch, among other things, increases the positive voltage on the capacitor 7 so that once the circuit 4 is triggered to its "on" condition, an artificially increased negative going signal appears across the input of the Schmitt trigger circuit so that the relay 28 does not become deenergized until the amplitude of the signal input to circuit 4 drops to the "turn off" level (100 millivolt). In other words, this feedback branch provides an increased difference in the voltage necessary to operate the on-off signal responsive circuit 4 between its "on" and "off" conditions than would be the case without this branch circuit.

A DC power source 89 for the transistors 19 and 25 may be a more or less conventional power source including a full wave rectifier circuit 90 comprising rectifiers 92 and 94 coupled between the opposite ends of the aforementioned secondary windings 17c. The anode electrodes of the rectifiers 92 and 94 are coupled to a common conductor 96 leading to one of the plates of a filter capacitor 98 whose opposite plate is connected to a conductor 100 extending to the center tap point of the secondary winding 17c. The conductor 100 extending to the center tap of the transformer 17c acts as a source of positive potential and is connected to the aforementioned positive bus 32 through a conductor 102. The ground line 10 is coupled by a conductor 104 to the emitter electrode 106e of a transistor 106 whose collector electrode 106c is connected to one end of a resistor 108 whose opposite end is connected to the conductor 96 constituting the negative output of the full wave rectifier circuit 90. The base electrode 106b of the transistor 106 is connected to Zener diode 110. A resistor 112 is connected from the juncture of the Zener diode 110 and the base electrode 106b of transistor 106 and the juncture between capacitor 98 and the resistor 108 to provide a stable reference voltage for a well-known series regulator circuit formed by the transistor 106.

It should be understood that numerous modifications may be made in the most preferred forms of the invention described above without deviating from the broader aspects described above. For example, the Schmitt trigger circuit could be modified so the control voltage receiving transistor 25 is initially nonconductive while transistor 27 is initially conductive if the polarity of the control signals is reversed. In such case, the pulsed voltage would still most advantageously be applied to transistor 27 to keep the voltage conditions of the control voltage receiving transistor 25 more stabilized. Also, the relay 28 could be placed in the collector circuit of the normally nonconducting transistor of the Schmitt trigger circuit.

We claim:

1. In a Schmitt trigger circuit including a pair of corresponding current control devices each including a pair of load terminals and a control terminal, common resistor means connected between corresponding load terminals of said current control devices and a common voltage reference point, a voltage divider network of resistance means coupled across the load terminal of one of said current control devices remote from the load terminal connected to said common resistor means and a said common voltage reference point, the control terminal of the other current control device being connected to an intermediate point of said voltage divider network wherein upon the connection of the load terminals of said current control devices to a source of DC voltage of a given polarity a signal level responsive circuit results wherein one of said current control devices is normally conducting and the other current control devices is normally nonconducting in the absence of a control signal input coupled to the control terminal of said one current control device, and the application of a control signal to the latter control terminal above an upper trip level will reverse the conductive states of said current control devices as long as the magnitude of said control signal does not fall below a lower trip level, the improvement comprising sources of DC voltage of said given polarity respectively connected to said load terminals of the current control devices through said common resistor means, at least one of which sources being a pulsed DC voltage source.

2. The Schmitt trigger circuit of claim 1 wherein said pulsed DC voltage source is connected to the load terminals of said other current control device, and the other source of DC voltage connected to said one current control device provides a steady DC voltage of said polarity.

3. The Schmitt trigger circuit of claim 2 wherein said source of pulsating DC voltage provide DC pulses of a fixed frequency, and the Schmitt trigger circuit is combined with a control signal source for said control terminal of said one current control device which control signal source provides spaced pulses of varying amplitude and also of the same phase as that of the output of said source of pulsating DC voltage so the circuit is operated only by pulsed control signals of the desired phase, the envelope of the pulsed waveform of said control signal source varying between said upper and lower trip levels.

4. In combination, a source of a control signal of varying instantaneous value which signal is to initiate a given control function when it varies in a first given-direction and reaches a first given level and is to terminate such function when the magnitude of the signal reverses in direction and reaches a second given level; and a signal level responsive circuit having an input connected to the output of said signal source and providing a first output condition for providing said function when the magnitude of said control signal fed thereto increases in said first given direction and reaches a given "turn on" level and providing a second output condition for terminating said function when the magnitude of said control signal fed thereto reverses in direction and reaches a given "turn off" level, thereby to provide a given overall circuit hysteresis, said signal level responsive circuit including a trigger circuit responsive to the input of the signal level responsive circuit and which effects operation of the signal level responsive circuit between said first and second output conditions when said input control signal varies between said "turn on" level and a level closer to said turn on level than said given "turn off" level said trigger circuit comprising a pair of corresponding current control devices each including a pair of load terminals and a control terminal, common resistor means connected between one of the corresponding load terminals of said current control devices and a common voltage reference point, a voltage divider network of resistance means coupled across the load terminals of one of said current control devices remote from the load terminal connected to said common resistor means and said common voltage reference point, the control terminal of the other current control device being connected to an intermediate point of said voltage divider network, wherein upon the connection of the load terminals of said current control devices to a source of DC voltage of a given polarity a signal level responsive circuit wherein one of said current control devices is normally conducting and the other current control device is normally nonconducting to effect said second output condition in the absence of a control signal input coupled to the control terminal of said one current control device and the application of a control signal to the latter control terminal at or above an upper trip level which is said "turn on" level will reverse the conductive states of said current control devices to effect said first output condition as long as the magnitude of said control signal does not fall below a lower trip level which is said level closer to said "turn on" level than said "turn off" level, and sources of DC voltage of said given polarity respectively connected to said load terminals of the current control devices through said common resistor means, at least one of which sources being a pulsed DC voltage source; means connecting the output of said control signal source to said control terminal of said one current control device; and control signal modifying means responsive to the operation of said signal level responsive circuit to said first output condition for modifying the signal fed to the control terminal of said one current control device to artificially vary the amplitude of the control signal fed thereto so as to provide a resultant signal which is closer to said given "turn on" level.

5. The combination of claim 4 wherein said source of pulsating DC voltage provide DC pulses of a defined fixed frequency and said control signal source provides spaced pulses of varying amplitude and of the same phase as that of the output of said source of pulsating DC voltage so the circuit operated only by pulsed control signals of the desired phase, the envelope of the pulsed waveform of said control signal source varying between said upper and lower trip levels.

6. The combination of claim 5 wherein said trigger circuit is a Schmitt trigger circuit.

* * * * *